April 26, 1938. B. N. WALLIS 2,115,504
AIRCRAFT FRAME STRUCTURE
Filed Feb. 18, 1937 6 Sheets-Sheet 1

April 26, 1938.  B. N. WALLIS  2,115,504
AIRCRAFT FRAME STRUCTURE
Filed Feb. 18, 1937   6 Sheets-Sheet 2
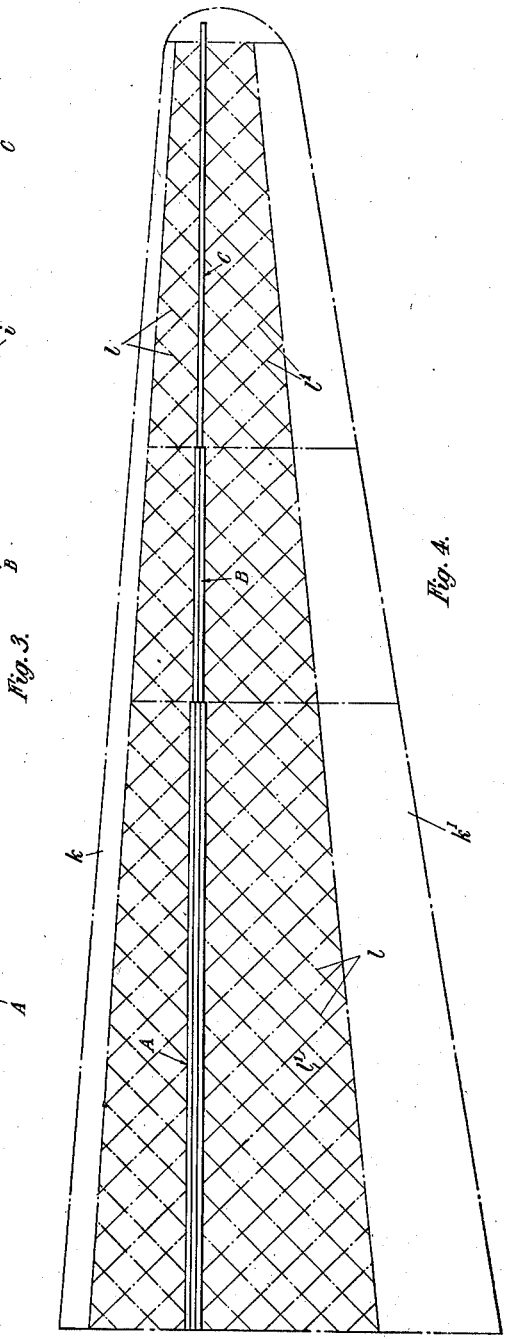

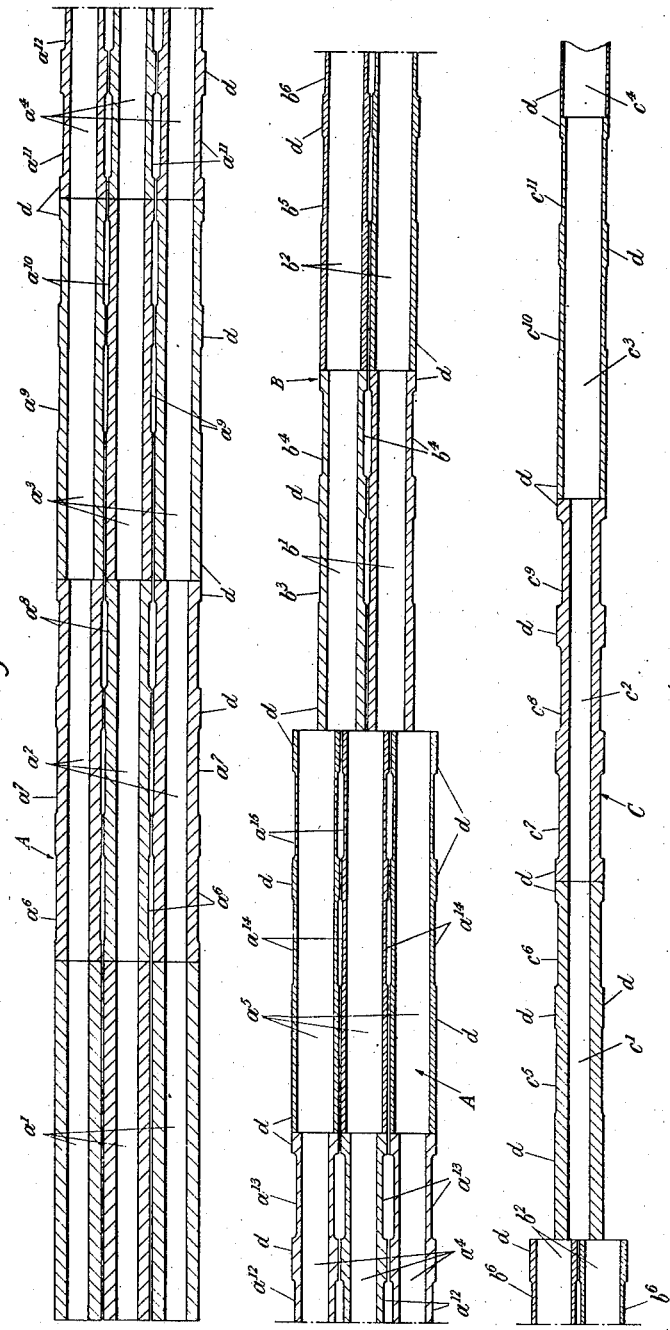

April 26, 1938.   B. N. WALLIS   2,115,504
AIRCRAFT FRAME STRUCTURE
Filed Feb. 18, 1937   6 Sheets-Sheet 4
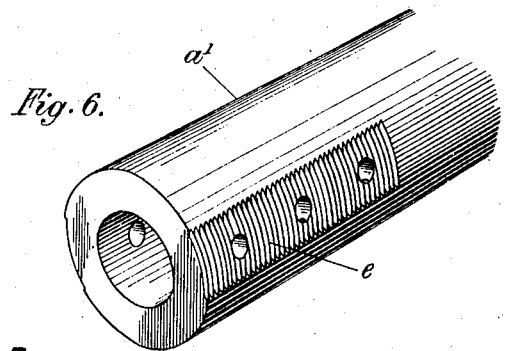
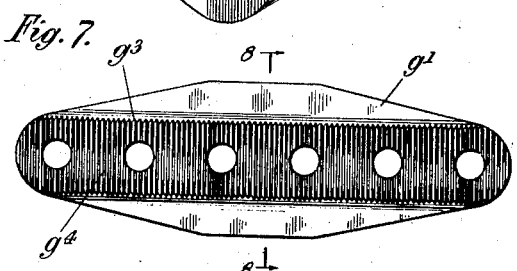
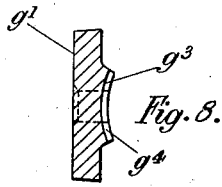
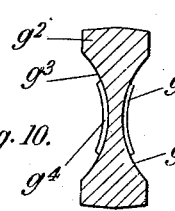
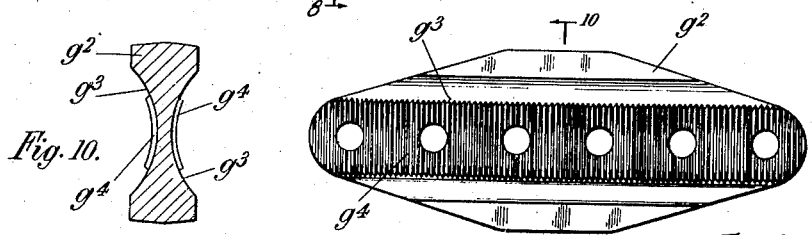
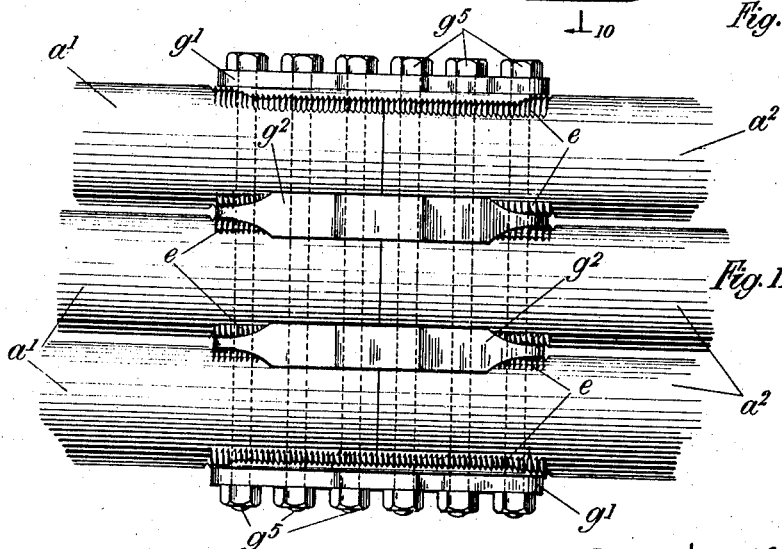

April 26, 1938.  B. N. WALLIS  2,115,504
AIRCRAFT FRAME STRUCTURE
Filed Feb. 18, 1937  6 Sheets-Sheet 6
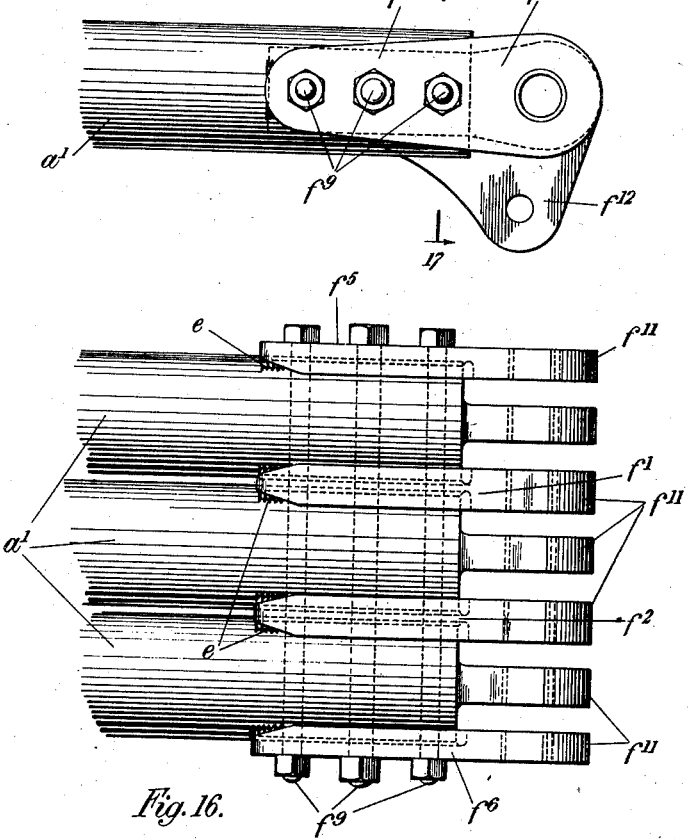
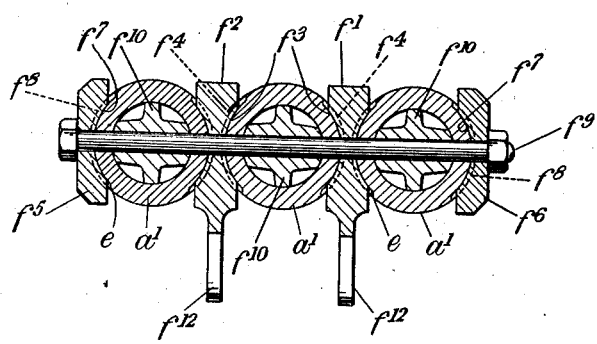

UNITED STATES PATENT OFFICE 2,115,504

AIRCRAFT FRAME STRUCTURE

Barnes Neville Wallis, Weybridge, England, assignor to Vickers (Aviation) Limited, Weybridge, Surrey, England Application February 18, 1937, Serial No. 126,500
In Great Britain February 27, 1936

9 Claims. (Cl. 244—123)

This invention relates to the construction of wings, fuselages and other similar framework parts of aircraft (hereinafter termed "cantilever aircraft structures") in which tubular booms with or without bracing webs (hereinafter referred to as "webs") are employed.

According to this invention the booms are constructed in spanwise sections comprising multiple side-by-side tubes in the root section and a decreasing number of tubes in other sections beyond the root section. The tubes in each section are of uniform outside size but are varied in wall thickness.

By "uniform outside size" as will hereinafter appear I do not mean that the outside dimensions will necessarily be invariable throughout but that those parts of the tubes where a junction is effected with contacting fittings will be of equal dimensions, intermediate which parts the external dimensions may be reduced.

The tubes in each section so formed are to be rigidly connected end-to-end with their axes in continuous alignment. To enable them to be so connected the ends of the tubes are serrated over a section of their surface on opposite sides to a distance longitudinally of the tube of say two diameters, the serrations being circumferential in the form of a screw thread, preferably but not necessarily without having any helical pitch. The serrations may project outwardly of the tubes or they may be cut into the tube and they may suitably be formed by milling cutters rotating against the surface of the tube, or a projection on the tube, while the tube is rotated through a suitable angle, say, for instance, a sixth of the circumference. A fishplate having a face curved to fit the tube is serrated on its face so as to fit and interlock with the serrations on the end of one of the tubes when the said fishplate is applied to the tube. The fishplate may suitably be tapered in thickness and in width, the greatest thickness being located at the actual junction of the ends of the two tubes to be connected. A similar fishplate is applied to the opposite side of the two tubes with its serrations fitting into the corresponding serrations on the tubes, and means is provided for holding the fishplates at the opposite sides firmly in the interlocked position, as, for instance, by means of bolts passing through the fishplates and tubes from side-to-side. Some of the fishplates may be formed with curved faces on opposite sides to fit two of the side-by-side tubes in each section, these fishplates being common to the two tubes and not only connect the tubes end-to-end but also connect one tube to the other tubes at one or each side. The tubes in one section are also connected to those in a continuing section by means of similar serrations on the ends of the tubes and serrated fishplates. It will be appreciated that the tubes of uniform external diameter or size but of different gauge may be connected in this way, and thus tubular booms for use in cantilever aircraft structures may be built up of diminishing aggregate cross-section area and weight as the distance increases from the root outwards.

It is an important feature of this invention that the fishplates and interengaging serrations, together with the similarly formed packing and clamping plates, permit of the construction of booms in sections in which the number of tubes and/or the cross-sectional area of the tubes in each section is varied according to the loads. The booms may, for example, be built up in pairs interconnected by webs to form spars, with the booms constructed with single or multiple tubes arranged as hereinbefore described. Thus, for instance, in a wing to which this form of spar is particularly applicable, the root section may be constructed with booms each having three side-by-side tubes; the wing tip section may be constructed with booms each having a single tube and the intermediate section may be constructed with booms each having two side-by-side tubes. The invention is, however, not only applicable to booms interconnected by a web to form a spar but is also applicable to booms without webs, in which case the booms are only attached to the frame members or to a stressed skin.

A boom built up in this manner is advantageous in that it allows tubes of similar external size to be used throughout the span and thus facilitates attachment thereto of other parts of the structure and yet it permits a tube of the most economical section to be employed. Thus multiple tubes of small external diameter or size can be used, the mass of which can be located at a minimum distance from the contour and in the position of optimum value for resisting the loads.

Such booms are particularly suitable for geodetic fuselages or wings as described in my United States Patents Nos. 1,894,011 and 1,985,649, in which case the external diameter or size of the tubes in the booms will correspond with the depth of the geodetic bracing members which are attached thereto in such a manner that the neutral axes of the bracing members intersect the axes of the tubes.

The invention will be particularly described, by way of example, with reference to a wing comprising spanwise booms and geodetic bracing members as shown in the accompanying drawings in which:—

Figure 2 is a diagram illustrating generally the arrangement of the tubes in the boom.

Figure 3 is a diagrammatic side elevation of the spar removed.

Figure 4 is a diagrammatic plan view of the wing indicating the arrangement of the connections of the geodetic members to the booms.

Figure 1:
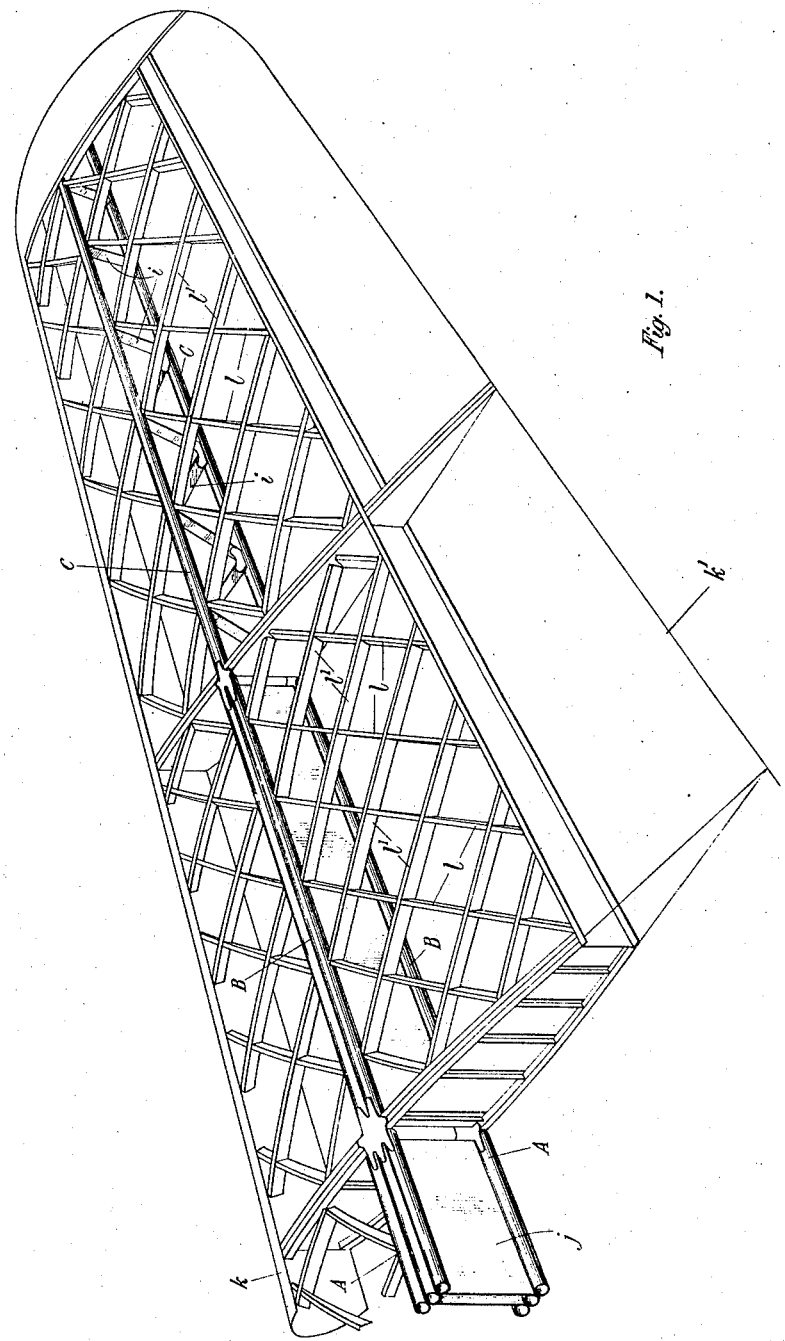
Figure 1 is a perspective view of the wing but showing part of the root portion removed to illustrate more clearly the arrangement of the spar.

Figures 5, 5a, 5b taken together constitute a section through the tubes in one of the booms illustrating the method of arranging the tubes for the geodetic wing as shown in Figures 1 and 4.

Figure 6 is a perspective view of the end of one tube showing the serrations.

Figure 7 is an inside view of one of the fishplates removed.

Figure 8 is a section on the line 8—8 in Figure 7.

Figure 9 is a side view of one of the fishplates common to two side-by-side tubes and arranged to extend between these tubes.

Figure 10 is a section on the line 10—10 in Figure 9.

Figure 11 is a plan view of the adjacent ends of two series of end-to-end tubes showing the fishplates connected thereto.

Figure 12:
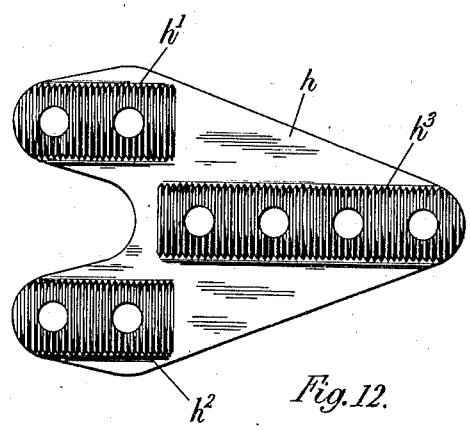

Figure 12 is an inside view of one of the fishplates used for connecting the tubes in one section to the continuing tubes in the next section.

Figure 13:
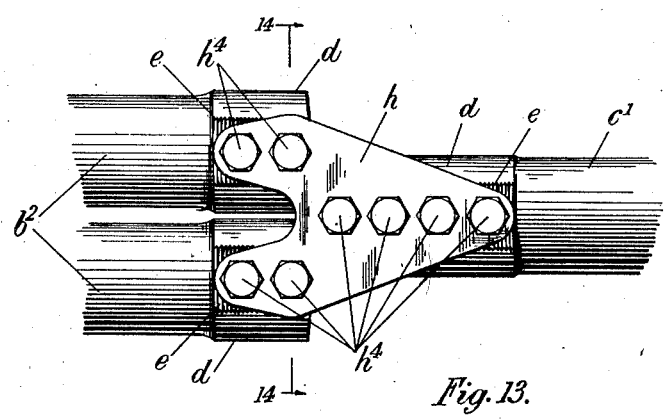

Figure 13 is a plan view of the adjacent ends of the tubes in two adjacent sections showing the fishplates connected thereto.

Figure 14:
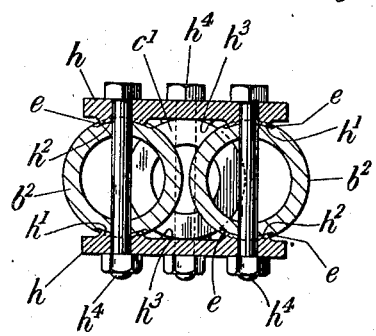

Figure 14 is a section on the line 14—14 in Figure 13.

Figure 15 is a side elevation of the root end of a boom and the fitting for attaching it to the fuselage.

Figure 16 is a plan view of Figure 15.

Figure 17 is a section on the line 17—17 in Figure 15.

In the construction of a multiple tube, boom or spar, the tubes are arranged generally as indicated diagrammatically in Figure 2. As shown in Figure 2, the sections marked A, B and C comprise multiple and single tubes and where multiple tubes are provided the side-by-side tubes are of the same form and are designated therefore by like references. The root section A comprises three side-by-side tubes, starting at the root with tubes $A^1$ of the thickest material, followed by tubes $A^2$ of thinner material; the intermediate section B comprises two side-by-side tubes, starting with tubes $B^1$ of the thickest material and followed by tubes $B^2$ of thinner material; and finally the wing tip section C comprises a single tube $C^1$ of the thickest material followed by a tube $C^2$ of thinner material.

This arrangement is preferably extended and the reduction in thickness is made to approximate more closely to the bending moment by the method shown in Figure 5. The 3—2—1 tube arrangement with side-by-side tubes, as previously explained, is followed but a greater number of end-to-end tubes and/or a greater variation in the wall thickness of the material is produced. The root section A comprises five tubes $a^1$, $a^2$, $a^3$, $a^4$, $a^5$ end-to-end in continuous alignment. Tube $a^1$ is a tube of the thickest material without any variation, tube $a^2$ is of the same thickness as $a^1$ but is cut away at $a^6$, $a^7$, $a^8$, the cut at $a^8$ being deeper than at $a^6$ and $a^7$. Tube $a^3$ is of thinner material and is also cut away at $a^9$, $a^{10}$, the cut $a^{10}$ being deeper than $a^9$. Tube $a^4$ is of the same thickness as $a^3$ and is cut away at $a^{11}$, $a^{12}$, $a^{13}$, which are progressively deeper than each other and $a^{10}$. Tube $a^5$ is of thinner material again and is further cut away at $a^{14}$, $a^{15}$ by progressively deeper cuts. Having reached the size of tube with the largest economical internal bore the number of tubes side-by-side is reduced in the intermediate section B to two. The intermediate section comprises two tubes end-to-end in continuous alignment, the first $b^1$ which reverts to thicker material than in the adjacent root section tube, has cut away parts $b^3$, $b^4$, that of $b^4$ being deeper than $b^3$. Tube $b^2$ is of thinner material again and is cut away at $b^5$, $b^6$ as before. The wing tip section C comprises tubes $c^1$, $c^2$, $c^3$, and $c^4$; $c^1$, $c^2$ with the same thickness of material having cut away parts $c^5$, $c^6$, $c^7$, $c^8$, $c^9$ of progressively increasing depth. Tube $c^3$ is of thinner material and has progressively deeper cut away parts $c^{10}$, $c^{11}$, while $c^4$ is of uniform gauge to the end. At each end of each cut away tube and also intermediate their ends "lands" $d$ are left, which lands are uniform in diameter with that of the uncut tubes. All the tubes are formed on opposite faces at each of their ends with serrations $e$ as shown in Figure 6.

Where the sections are formed with two or more tubes arranged end-to-end, as illustrated in Figure 5, these tubes are connected in axial alignment with each other by the serrations $e$ as hereinbefore described on opposite lateral sides adapted to interlock, as shown in Figure 11, with fishplates $g^1$, $g^2$ (Figures 7–10) having faces $g^3$ curved and serrated at $g^4$ to correspond with the tubes to be connected side-by-side and end-to-end. The fishplates $g^2$ are common to two side-by-side tubes and are formed at opposite sides with the serrated faces $g^3$. Means, such as bolts $g^5$, are also provided to clamp these fishplates $g^1$, $g^2$ and tubes together. The tubes in the different sections are also connected together by similar serrations and serrated fishplates, the serrations being formed on the upper and lower sides of the tubes instead of on the opposite lateral sides and the serrated surfaces of the fishplates being formed to correspond in position with the tubes to be connected. As applied, for instance, to the intermediate and wing tip sections hereinbefore described the multiple serrated fishplates $h$ are formed, as shown in Figure 12, with duplex serrated faces $h^1$, $h^2$ adapted to engage with the serrations $e$ on the ends of the two tubes $b^2$, $b^2$ at the outer end of the intermediate section and with one serrated face $h^3$ located centrally with respect to said duplex faces $h^1$, $h^2$ to coincide with the single tube $c^1$ in the wing tip section located with its axis centrally between the axes of the two tubes $b^2$, $b^2$. Bolts $h^4$ hold the fishplates $h$ interlocked with the tubes $b^2$, $b^2$ and $c^1$, as shown in Figures 13 and 14.

Between the tubes $a^1$ at their inner ends packing pieces $f^1$, $f^2$ are arranged, as shown in Figs. 15–17, which packing pieces are shaped at $f^3$ to fit partly around the tubes and their shaped faces $f^3$ are serrated at $f^4$ to interlock with the serrations $e$ on the tube. On the outsides of the tubes $a^1$, clamping plates $f^5$, $f^6$ are arranged, each having a face $f^7$ curved to fit the tube and serrated at $f^8$ to interlock with the serrations $e$ on the tubes. Means is provided for clamping the clamping plates at opposite sides of the bank of tubes $a^1$ against these tubes and packing pieces $f^1$, $f^2$, as, for instance, clamping bolts $f^9$ passing through the clamping plates $f^5$, $f^6$, tubes $a^1$ and packing pieces $f^1$, $f^2$ from side-to-side. Supporting pieces $f^{10}$ are provided in the tubes at the points where said clamping plates and packing pieces are attached to prevent the tubes from being crushed by the bolts $f^9$.

Thus the tubes employed in the boom or spar can be made of uniform exterior diameter or size throughout the span but need not be of uniform gauge throughout; the gauge of the tubes in each section may be varied in accordance with the loads imposed on different parts of the structure. The gauge of the tubes in the different sections may also vary.

This construction lends itself particularly to the construction of tubular booms in which the number of tubes is reduced as the booms extend outwards from the root in the direction of the wing tips.

Additional tubes may be joined in either of the ways hereinbefore described, in continuation of the same number of multiple tubes or in increasing numbers towards the root, in which latter case the axes of the continuing tubes will be located midway between the axes of the first tubes. At the extreme root end of the wing the packing pieces $f^1$, $f^2$ and clamping pieces $f^5$, $f^6$ and supporting pieces $f^{10}$ may be caused to project from the tubes to form the bearing lugs $f^{11}$ of a terminal joint for attaching the booms to the structure of the fuselage.

Ears or lugs, such as $f^{12}$ (Fig. 15) may be formed on the packing pieces and/or the fishplates and/or clamping plates for the attachment of lateral members adapted to take loads at right angles or diagonally to the booms.

In building up a Warren braced spar or girder the bracing members (indicated at $i$ in Figures 1 and 3) or some of them can be attached to the fishplates and clamping plates and packing pieces. Alternatively, in a plate web, spar or girder the web plates (indicated at $j$ in Figure 1) may be clamped between the tubes in the multiple tube booms.

In building up a wing structure, as shown in Figures 1 and 4, contour members forming or supporting the covering of the wing may be attached to the upper and lower booms comprising the sections A, B and C constructed as hereinbefore described with or without the bracing members $i$ as shown in Figure 3 or plate web $j$ in the sections A and B and bracing members $i$ in the section C as shown in Figure 1. Where geodetic contour members are provided, as illustrated, these are arranged to extend between the booms and false leading and trailing edges $k$, $k^1$ respectively, and comprise two series of bracing members marked $l$, $l^1$, shaped to the contour of the structure and of greater depth than width, said members being arranged in geodetic lines intersecting the booms and each other where they are rigidly connected to the booms and to each other and being twisted about their neutral axes until their depth is normal to the contour at all points.

What I claim as my invention and desire to secure by Letters Patent is:—

1. A boom for cantilever aircraft structures, constructed of a number of uniform outside size tubes arranged in spanwise sections including a root section and an end section, with multiple side-by-side tubes of the thickest material at the inboard end of the root section and multiple side-by-side tubes of thinner material at the outboard end of the root section, and with at least one tube at the inboard end of the end section of thicker material than that of the tube in the outboard end of the root section, and at least one tube of thinner material at the outboard end of the end section, the tubes in the end section being in staggered symmetrical relationship to those in the root section.

2. A boom for cantilever aircraft structures, constructed of a number of uniform outside size tubes arranged in spanwise sections including a root section, and an end section, with multiple side-by-side tubes of the thickest material at the inboard end of the root section and multiple side-by-side tubes of thinner material at the outboard end of the root section, and with a less number of tubes at the inboard end of the end section of thicker material than that of the tubes at the outboard end of the root section and tubes of thinner material at the outboard end of the end section, means being provided for fixing the said tubes in the end section in staggered symmetrical relationship to those in the root section.

3. A boom for cantilever aircraft structures, constructed of a number of uniform outside size tubes arranged in spanwise sections including a root section and an end section, with multiple side-by-side tubes of the thickest material at the inboard end of the root section and multiple side-by-side tubes of thinner material at the outboard end of the root section, and with at least one tube at the inboard end of the end section of thicker material than that of the tube in the outboard end of the root section, the inboard end tube being in staggered symmetrical relationship to the tubes in the root section, and at least one tube of thinner material at the outboard end of the end section extending in continuation of said inboard end tube, said tubes having their ends externally and circumferentially serrated, fishplates at opposite sides of said tubes curved to fit the serrated parts of the tubes in each pair of adjoining sections and serrated to interlock with the serrations on the tubes and means for holding the fishplates firmly interlocked with the serrations on the tubes.

4. A boom for cantilever aircraft structures, constructed of a number of uniform outside size tubes arranged in spanwise sections including a root section and an end section, with multiple side-by-side tubes of the thickest material at the inboard end of the root section and multiple side-by-side tubes of thinner material at the outboard end of the root section, and with at least one tube at the inboard end of the end section of thicker material than that of the tube in the outboard end of the root section, this inboard end tube being in staggered symmetrical relationship to the tubes in the root section, and at least one tube of thinner material at the outboard end of the end section extending in continuation of said inboard end tube, said tubes in the outboard sections being arranged end-to-end with those in the inboard sections and having their ends externally and circumferentially serrated, fishplates extending across the joint and located at opposite sides of the end-to-end tubes and of the tubes in each pair of adjoining sections, said fishplates being curved to fit the serrated parts of said tubes and serrated to interlock with the serrations on the tubes, and means for holding the fishplates firmly interlocked with the serrations on the tubes.

5. A boom for cantilever aircraft structures, constructed of a number of uniform outside size tubes arranged in spanwise sections including a root section and an end section, with multiple side-by-side tubes of the thickest material at the inboard end of the root section and multiple side-by-side tubes of thinner material at the outboard end of the root section, and with at least one tube at the inboard end of the end section of thicker material than that of the tube in the outboard end of the root section, this inboard end tube being in staggered symmetrical relationship to the tubes in the root section, and at least one tube of thinner material at the outboard end of the end section extending in continuation of said inboard end tube, said tubes having external and circumferential serrations formed on their opposite sides symmetrically of the common plane of the axes of the tubes at the root end of the boom, packing pieces shaped to fit in between each pair of side-by-side tubes, clamping plates at opposite sides of the boom shaped to fit partly around the tubes, said packing pieces and clamping plates being serrated to interlock with the serrations on the tubes and means for holding the packing pieces and clamping plates firmly interlocked with the serrations on the tubes.

6. A boom for cantilever aircraft structures comprising a number of uniform outside size tubes arranged to form multiple side-by-side tube sections and a single row tube section with the greatest number of multiple tubes in a root section and the single row of tubes in an end section, the number of multiple tubes in intermediate sections being progressively reduced from the root section to the end, and said intermediate tubes being in staggered symmetrical relationship to those in adjacent sections, the said multiple side-by-side and single row tube sections each comprising a number of tubes arranged end-to-end with the thickest walled tube at the inner end of each of the sections and with the tube walls reduced in thickness from the innermost tube outward, and means for rigidly connecting the tubes in each section and in the different sections together.

7. A boom for cantilever aircraft structures comprising a number of uniform outside size tubes arranged to form multiple side-by-side tube sections and a single row tube section arranged with the greatest number of multiple tubes in a root section and the single row of tubes in an end section, the number of multiple tubes in intermediate sections being progressively reduced from the root section to the end section, and said intermediate tubes being in staggered relationship to the tubes in the root section, the said multiple side-by-side tube sections and single tube section each comprising a number of tubes arranged end-to-end with the thickest walled tube at the inner end of each of the sections, and with the walls of the remaining tubes progressively reduced by increasing the bore and by decreasing the external size at intervals, means for rigidly connecting the tubes in each section end-to-end and means for rigidly connecting the sections together.

8. A cantilever aircraft structure comprising at least two booms each constructed of a number of uniform outside size tubes arranged in spanwise sections including a root section and an end section, with multiple side-by-side tubes of the thickest material at the inboard end of the root section and multiple side-by-side tubes of thinner material at the outboard end of the root section, and with at least one tube of thicker material than that of the tube in the outboard end of the root section at the inboard end of the end section and at least one tube of thinner material at the outboard end of the end section, the tubes in the end section being in staggered symmetrical relationship to those in the root section, means for rigidly connecting the tubes in each section to those in a continuing section, and contour members shaped to the contour of the structure and attached to said booms.

9. A cantilever aircraft structure comprising two series of bracing members shaped to the external contour of the structure and of greater depth than width, said bracing members being arranged in geodetic lines intersecting each other and having their depth normal to the contour at all points, at least two booms attached to said bracing members, each boom being constructed of a number of uniform outside size tubes arranged in spanwise sections including a root section and an end section, with multiple side-by-side tubes of the thickest material at the inboard end of the root section and multiple side-by-side tubes of thinner material at the outboard end of the root section, and with at least one tube of thicker material than that of the tube in the outboard end of the root section at the inboard end of the end section, and at least one tube of thinner material at the outboard end of the end section, the tubes in the end section being in staggered symmetrical relationship to those in the root section, and means for rigidly connecting the tubes in each section to those in a continuing section.

BARNES NEVILLE WALLIS.